(12) United States Patent
Byström et al.

(10) Patent No.: US 11,291,968 B2
(45) Date of Patent: Apr. 5, 2022

(54) REACTOR COMPRISING A NOZZLE FOR CLEANING FLUID, A KIT AND A METHOD

(71) Applicant: SPINCHEM AB, Umeå (SE)

(72) Inventors: Emil Byström, Tavelsjö (SE); Lars Eklund, Umeå (SE); Knut Irgum, Bullmark (SE)

(73) Assignee: SPINCHEM AB, Umea (SE)

( * ) Notice: Subject to any disclaimer, the term of this patent is extended or adjusted under 35 U.S.C. 154(b) by 195 days.

(21) Appl. No.: 16/094,940

(22) PCT Filed: Apr. 20, 2017

(86) PCT No.: PCT/EP2017/059338
§ 371 (c)(1),
(2) Date: Oct. 19, 2018

(87) PCT Pub. No.: WO2017/182545
PCT Pub. Date: Oct. 26, 2017

(65) Prior Publication Data
US 2019/0118151 A1   Apr. 25, 2019

(30) Foreign Application Priority Data
Apr. 21, 2016 (SE) .................................. 1650535-6

(51) Int. Cl.
 *B01J 8/08* (2006.01)
 *B01J 8/10* (2006.01)
(Continued)

(52) U.S. Cl.
CPC .......... *B01J 8/085* (2013.01); *B01D 21/0012* (2013.01); *B01J 4/004* (2013.01); *B01J 8/006* (2013.01);
(Continued)

(58) Field of Classification Search
CPC . B01J 8/085; B01J 8/0015; B01J 8/006; B01J 8/10; B01J 8/222; B01J 8/20;
(Continued)

(56) References Cited

U.S. PATENT DOCUMENTS 2,935,495 A * 5/1960 Kennedy .................... B01J 8/10
526/62
4,683,062 A    7/1987 Krovak et al.
(Continued)

FOREIGN PATENT DOCUMENTS

KR   101259353 B1 *  4/2013 ............ C12M 39/00
KR   101259353 B1    4/2013
(Continued)

OTHER PUBLICATIONS

KR101259353B1—Machine English Translation (Year: 2013).*
(Continued)

*Primary Examiner* — Michael L Hobbs
*Assistant Examiner* — Lenora A Abel
(74) *Attorney, Agent, or Firm* — Moser Taboada

(57) ABSTRACT

The invention refers to a reactor and a method respectively for performing, by means of solid reaction members, a biological or chemical transformation, or physical or chemical trapping from, or release of agents to, a fluidic media, and a subsequent cleaning of the reactor, said reactor comprising a vessel (11) in which a transformation device (100) has been mounted. The invention also refers to a reactor kit comprising such reactor. The reactor comprises at least one nozzle (15) arranged on the longitudinal inner wall of the vessel (11). The at least one nozzle (15) is arranged to direct a flow of a cleaning fluid (CF) in a direction towards a longitudinal centre axis (L1) of a flow distributor (1) arranged in the vessel (11).

7 Claims, 5 Drawing Sheets

Figure 1:
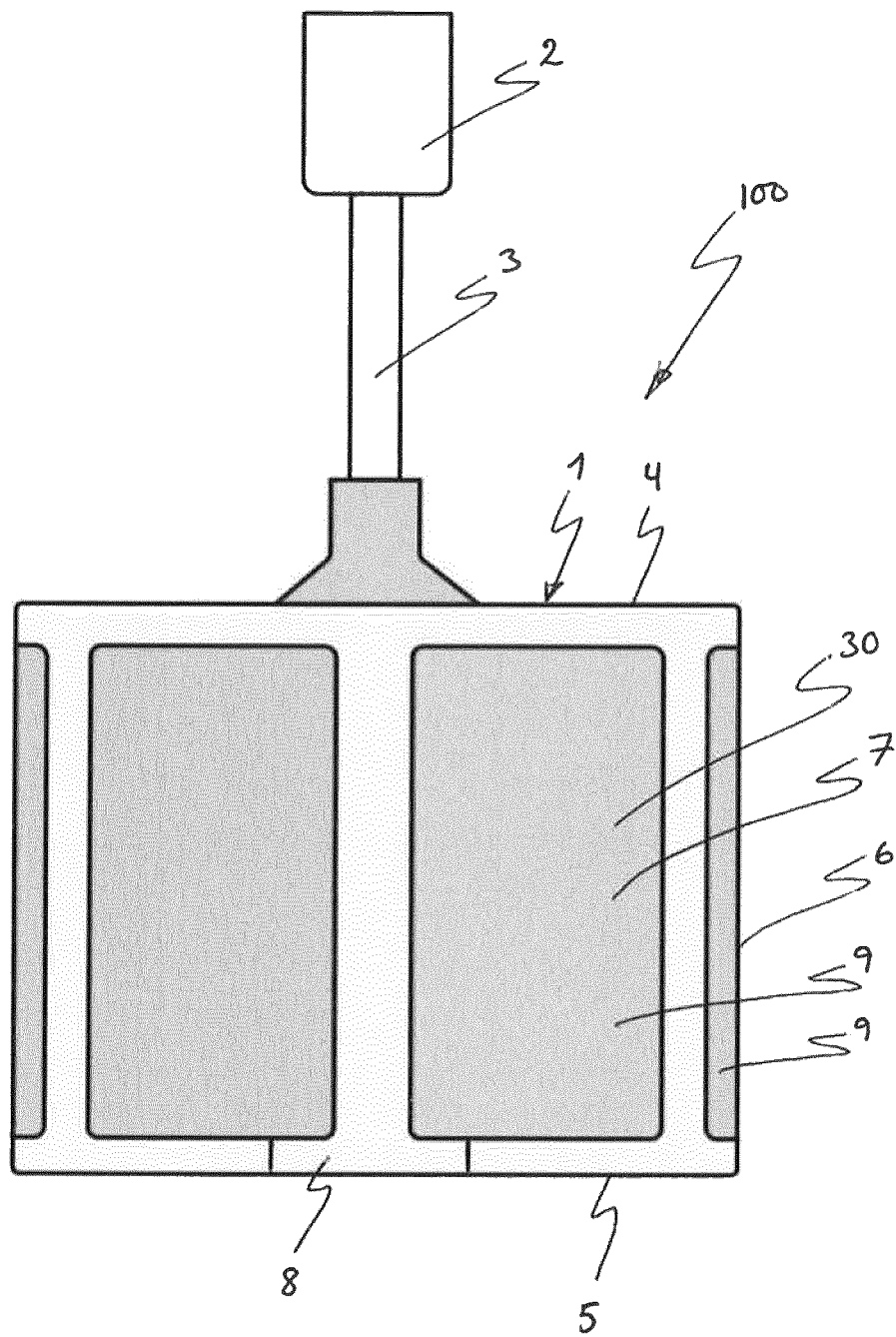

(51) Int. Cl.
  *B01J 8/22* (2006.01)
  *B01J 19/18* (2006.01)
  *B08B 3/10* (2006.01)
  *B01J 8/20* (2006.01)
  *B08B 9/00* (2006.01)
  *B01D 21/00* (2006.01)
  *B01J 4/00* (2006.01)
  *B01J 8/00* (2006.01)
  *B08B 9/08* (2006.01)

(52) U.S. Cl.
  CPC ............... *B01J 8/0015* (2013.01); *B01J 8/10* (2013.01); *B01J 8/20* (2013.01); *B01J 8/222* (2013.01); *B01J 8/226* (2013.01); *B01J 19/18* (2013.01); *B01J 19/1806* (2013.01); *B08B 3/10* (2013.01); *B08B 9/00* (2013.01); *B08B 9/08* (2013.01); *B01J 2208/00752* (2013.01); *B01J 2208/00761* (2013.01); *B01J 2208/00814* (2013.01); *B01J 2208/00938* (2013.01)

(58) Field of Classification Search
  CPC ........ B01J 4/004; B01J 19/18; B01J 19/1806; B01J 2208/00752; B01J 2208/00761; B01J 2208/00814; B01J 2208/00938; B01D 21/0012; B08B 3/10; B08B 9/00; B08B 9/08

USPC ...................................................... 435/286.1
See application file for complete search history.

(56) References Cited

U.S. PATENT DOCUMENTS 5,992,431 A * 11/1999 Weber ............... H01L 21/02052
                                                                    134/135
9,333,479 B2 * 5/2016 Persson ...................... B01J 8/10

FOREIGN PATENT DOCUMENTS

WO    WO-2015050491 A   *  4/2015   .............. B01F 7/163
WO    WO-2015050491 A1     4/2015
WO    WO2015060764 A1      4/2015

OTHER PUBLICATIONS

International Search Report dated Jun. 16, 2017 for PCT Application No. PCT/EP2017/059338.
Notice of Allowance dated Oct. 26, 2016 for Patent Application No. 1650535-6.

* cited by examiner

REACTOR COMPRISING A NOZZLE FOR CLEANING FLUID, A KIT AND A METHOD

FIELD OF INVENTION

The present invention refers to a reactor and a method respectively for performing, by means of solid reaction members, a biological or chemical transformation, or physical or chemical trapping from, or release of agents to, a fluidic media. The invention further refers to a reactor kit comprising such reactor.

BACKGROUND OF THE INVENTION

Heterogeneous processes in chemistry and biotechnology are unit operations that encompass a solid member (including, but not limited to, immobilized chemical reagents, catalysts, scavengers, reaction supports, trapping sorbents, or immobilized biological materials such as enzymes, or cells or fragments thereof) contacting a fluidic medium carrying reactants or other agents, sample solutes, and/or products of the interactive processing of fluid-conveyed agent(s) with the solid members. Most such heterogeneous processes are critically dependent on convective flow of the fluidic medium to establish the necessary mass transfer between the fluidic and solid phases.

As a consequence, solid/fluid heterogeneous systems are therefore often operated in a continuous flow through mode, in which case a conventional packed column with a suitable design is often the preferred format for encapsulating the solid reaction member that is to be transited or percolated by the reaction medium. Numerous processes are, however, unfit for continuous processing. This applies in particular to processes where the solid reaction member is a soft and compressible gel which is prone to collapse in a packed column bed, in transformation schemes where sequential addition of agents and/or removal of by-products or desired products are necessary, or where the physical or chemical conditions must otherwise be altered during the course of processing with the solid reaction member. In those cases, a batch-wise processing model is often preferred.

Such batch-wise heterogeneous processing can be done by suspending the solid reaction member directly in the fluid medium as particulate material under agitation. Such process will normally call for a filtration or sedimentation step to separate the phases after the process has been brought to an end. The solid reaction members are typically introduced via a man hatch at the upper end of the reactor whereas the used members are released via a bottom valve. This type of reactor is although its overall simple design related to some problems. The solid reaction members are freely swirling around during the agitation whereby the solid reaction members are subjected to uncontrolled wear. This results in a reduced life time of the solid reaction members and it is also hard to estimate and dimension the contact surface and thereby the amount of solid reaction members necessary when running a batch. Further, the concentration of solid reaction members is restricted in order to avoid that the members are destroyed during agitation. In many cases the concentration should be lower than 10%.

Additionally, the cleaning of such reactor is often complicated. The used solid reaction members are released via a bottom valve and a cleaning nozzle is inserted via the man hatch. The cleaning process is time consuming and especially if performed as a GMP-process (Good Manufacturing Process) which is often the case in the pharmaceutical industry.

Alternatively, the fluidic medium can be circulated in the batch reactor through a packed reservoir containing the solid reaction members by means of a specially designed flow system comprising pumps and/or valves or the like, in order to accomplish the convective mass transfer needed for the transformation to take place. Such reactors are often quite complicated and must regularly be built on-site and adapted for a specific purpose. When cleaning such reactor the packed reservoir must be removed, emptied, cleaned, refilled and re-mounted.

Accordingly, available cleaning solutions for batch-wise heterogeneous processes are complex and expensive and there is a need for a simpler loading and unloading system and also a simplified and efficient cleaning system.

SUMMARY OF THE INVENTION

According to a first aspect, the invention provides a reactor for performing, by means of solid reaction members, a biological or chemical transformation, or physical or chemical trapping from, or release of agents to, a fluidic media. The reactor comprises a vessel in which a transformation device has been mounted, said transformation device comprising a cylindrical flow distributor comprising a top wall, a bottom wall and a peripheral wall extending between the top and bottom walls, whereby said walls define at least one confinement in which said solid reaction members can be entrapped and in which said transformation is performed. The flow distributor further comprises: at least one opening located in the vicinity of the centre of the bottom wall, said opening being adapted for receiving fluid medium and initially suspended solid reaction members and releasing fluid medium and used solid reaction members which have been entrapped in said confinement, at least one fluid medium outlet permeable for said fluid medium but impermeable for solid reaction members, said at least one fluid medium outlet being located on said peripheral wall, and a means for rotating the transformation device. The reactor is characterized in that the reactor further comprises at least one nozzle arranged on the longitudinal inner wall of the vessel, and wherein the at least one nozzle is arranged to direct a flow of a cleaning fluid in a direction towards a longitudinal centre axis of the flow distributor.

The reactor according to the invention allows for a very speedy and easy loading and unloading of the reactor to thereby allow repeated batch wise performing, by means of solid reaction members, a biological or chemical transformation, or physical or chemical trapping from, or release of agents to a fluidic media. During normal operation of the flow distributor, the reactor is loaded, i.e. filled with a desired amount of fluidic media and solid reaction members respectively. Then the flow distributor is rotated at an operation speed, whereby a vortex effect is caused in the vessel which sucks the solid reaction members into the flow distributor. The solid reaction members will be entrapped in the confinement of the flow distributor while reacting with the fluidic media circulating there through. As the batch of fluidic media has been processed to such degree that the reaction has reached a target level, the rotational speed of the flow distributor is reduced to a liquid draining speed. By liquid draining speed is meant a rotational speed at which the solid reaction members are maintained in the confinement of the flow distributor while the fluidic media may be drained from the vessel. The process may be repeated by filling the reactor anew with a new batch of fluidic media to be processed. This kind of filling and draining of liquid fluidic media may be repeated a number of times until the solid reaction members have been fully consumed or until a desired total volume of fluidic media has been processed.

Further, the reactor according to the invention allows for a very speedy, easy and thorough cleaning of the flow distributor by flushing the same with cleaning fluid. During the flushing, the solid reaction members entrapped in the flow distributor will effectively be removed from the confinement of the flow distributor and released from the vessel. The cleaning is made by first of all draining the fluidic medium from the vessel while at the same time rotating the flow distributor at a liquid draining speed. While draining the liquid, the solid reaction members will remain entrapped in the flow distributor. The rotational speed of the flow distributor is then reduced to a solid member releasing speed and a flow of cleaning fluid is directed via the at least one nozzle towards the outer peripheral wall of the flow distributor. The solid member releasing speed should be low enough for any vortex effect sucking and forcing fluid into the flow distributor via its opening in the bottom wall and further in a radial direction towards, and out via the peripheral wall, to be overruled. The force of the cleaning fluid to be ejected via the at least one nozzle will release and transfer the solid reaction members entrapped in the flow distributor in the opposite radial direction towards the centre where such solid reaction members may leave the flow distributor via the opening in the bottom wall. The cleaning fluid may be any suitable liquid fluid.

The cleaning may be initiated with intervals adapted to e.g. the type of solid reaction members used in the flow distributor and the type of fluidic medium to be processed. The cleaning may be initiated and executed in a few minutes. This offers substantial advantages in terms of work effort, time saving and cost savings as compared to prior art systems. The fluid pressure of the supplied cleaning fluid may be adapted to parameters such as the dimensions of the flow distributor and the type of solid reaction members. This also applies to the spray pattern of the at least one nozzle.

Alternatively the reactor may comprise a plurality of nozzles, the plurality of nozzles being distributed along the circumference and/or along the longitudinal extension of the longitudinal inner wall of the vessel, and wherein the plurality of nozzles are arranged to direct a flow of a cleaning fluid in a direction towards a longitudinal centre axis of the flow distributor.

The nozzle(s) may be supported by one or several supports arranged to extend in the longitudinal direction along the longitudinal inner wall of the vessel. The supports may be arranged to be removably attached to the inner wall of the vessel or be integral with the vessel. Alternatively, the supports may be attached with a connection through the lid of the vessel. The supports may be seen as baffles enhancing the turbulence in the vessel.

The one or several supports may form part of an insert. Thereby maintenance and complete cleaning of the vessel may be facilitated since an insert easily may be lifted out. The supports may by way of example constitute rests allowing such insert to rest against the bottom wall of the vessel.

Each support may comprise two or more nozzles distributed along the longitudinal extension of the support, and wherein two adjacent nozzles may be arranged to provide a longitudinally and continuously uniform spray pattern. By longitudinally and continuously uniform is meant a spray pattern with an essentially uniform density of the droplets as seen across an intended target surface. Thus, the density will be essentially uniform even in overlapping areas. By a longitudinal extension of the support, the target surface as seen on the peripheral wall of the flow distributor will be essentially rectangular and oriented essentially in parallel with the longitudinal centre axis of the vessel and the flow distributor.

The inner wall of the vessel may comprise means for enhancing the fluidic shear stress in any of the two rotary directions along said inner wall. The means for enhancing the fluidic shear stress may be formed by said support. Alternatively, the means for enhancing the fluidic shear stress may be provided as undulations extending along the longitudinal inner wall of the vessel. The means may be evenly distributed along the circumference of the vessel.

According to another aspect, the invention relates to a reactor kit for performing, by means of solid reaction members, a biological or chemical transformation, or physical or chemical trapping from, or release of agents to, a fluidic media. The kit comprises: a vessel; a cylindrical flow distributor comprising a top wall, a bottom wall and a peripheral wall extending between the top and bottom walls, whereby said walls define at least one confinement in which said solid reaction members can be entrapped and in which said transformation is arranged to be performed, the flow distributor further comprising at least one opening located in the vicinity of the centre of the bottom wall, said opening being adapted for receiving fluid medium and initially suspended solid reaction members and releasing fluid medium and used solid reaction members which have been entrapped in said confinement, and at least one fluid medium outlet permeable for said fluid medium but impermeable for solid reaction members, said at least one fluid medium outlet being located on said peripheral wall, and at least one nozzle adapted to direct a flow of a fluid in a direction towards a longitudinal centre axis of the flow distributor.

The advantages of the reactor as such have been thoroughly discussed above and to avoid undue repetition reference is made to the paragraphs above.

The at least one nozzle may be mounted on an insert to be arranged in the vessel.

According to yet another aspect, the invention refers to a method for performing, by means of solid reaction members, a biological or chemical transformation, or physical or chemical trapping from, or release of agents to, a fluidic media, according to the features given above. The method comprises the steps of:

a) supplying to the vessel a desired amount of solid reaction members;

b) filling the vessel with fluidic media to a desired level;

c) performing the chemical reaction by rotating the flow distributor at an operation speed until the chemical reaction between the solid reaction members and the fluidic media is deemed to have reached a target level, during which rotation a vortex V is generated causing the solid reaction members to be sucked and forced together with the fluid media into the confinement of the flow distributor via its central bottom opening, whereby the solid reaction members will be trapped against the inner walls of the flow distributor while the fluid medium is allowed to transfer in the radial direction out of the flow distributor via the at least one fluid medium outlets located in the peripheral wall of the flow distributor;

d) setting the rotation speed of the flow distributor to a liquid draining speed;

e) draining the fluidic media from the vessel via the bottom valve while maintaining the solid reaction members in the flow distributor;

f) repeating steps b)-e) until the solid reaction members have been consumed or until a desired total volume of fluidic media has been processed;

g) setting the rotation speed of the flow distributor to a solid member releasing speed and h) directing, by means of the at least one nozzle, a supply of cleaning fluid towards and through the peripheral wall of the flow distributor, thereby forcing the solid reaction members which have been entrapped in the confinement of the flow distributor in the radial direction towards the longitudinal center line of the flow distributor and further out of the flow distributor via the at least one opening located in the vicinity of the centre of the bottom wall and further out of the vessel via the open bottom valve.

The advantages of said reactor and the operation/use thereof have been thoroughly discussed above and to avoid undue repetition reference is made to the paragraphs above. By the inventive method, a very fast and effective loading and unloading is provided for. Further, a very easy and highly efficient cleaning process of the rotating flow distributor of the reactor is provided for, which reduces set-up time and hence valuable production time. The method is not restricted to any specific size of the reactor or the rotating flow distributor.

The cleaning fluid and the treated fluidic media, when released from the vessel via the bottom valve, may be fed to different dedicated collecting vessels.

The cleaning fluid and treated fluidic media may be filtered before being fed to the respective dedicated collecting vessels.

The cleaning fluid may be recirculated. Further, the cleaning fluid may be the same fluid as the fluidic media. The cleaning fluid may be supplied as a continuous or a pulsating flow.

BRIEF DESCRIPTION OF THE ENCLOSED FIGURES

The present invention will be further disclosed with reference to the enclosed figures, in which:

FIG. 1 discloses one schematic illustration of a transformation device.

Figure 2:
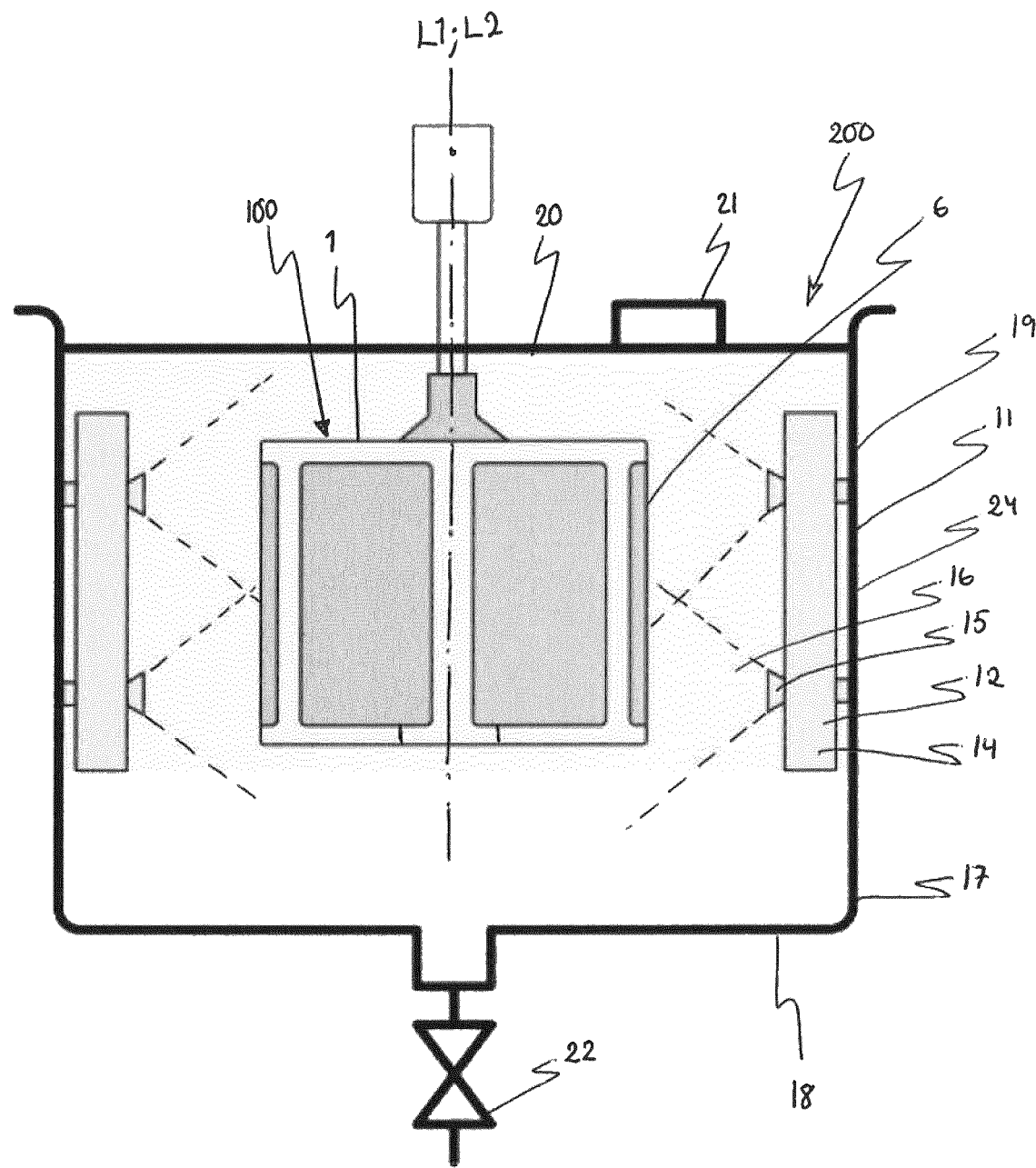

FIG. 2 discloses one embodiment of a rector in line with the present invention.

FIGS. 3a-3f schematically discloses the steps of the inventive method.

DETAILED DESCRIPTION OF PREFERRED EMBODIMENTS

In the following one embodiment of the present invention will be discussed starting with the overall design of the transformation device.

FIG. 1 presents a side view of one embodiment of a transformation device 100 that is a part of the present invention. The transformation device 100 comprises a flow distributor 1 and a rotation and/or oscillation means 2, typically an electrically, pneumatically, or hydraulically driven motor, joined to the flow distributor 1 by a drive shaft 3. The flow distributor 1 has a top wall 4, a bottom wall 5 and a longitudinal peripheral wall 6 extending between the top wall 4 and the bottom wall 5. The walls 4, 5, 6 define a confinement 7.

The bottom wall 5 has a central opening 8 which is arranged in the vicinity of the centre of the bottom wall 5. The confinement 7 is allowed to communicate with the ambience via the opening 8. The cross sectional area of the opening 8 is substantially smaller than the cross sectional area of the bottom wall 5.

The flow distributor 1 has an essentially cylindrical shape and the longitudinal peripheral wall 6 has an essentially circular cross-section. The peripheral wall 6 comprises fluid medium outlets 9. It goes without saying that the number and pattern of the fluid medium outlets 9 may be changed within the scope of the invention. The fluid medium outlets 9 are covered by a peripheral retaining mesh 30. The peripheral retaining mesh 30 is permeable for a fluid medium but not for solid reaction members.

Now turning to FIG. 2, one example of a reactor 200 with an implemented cleaning system in line with the invention is disclosed.

The reactor 200 comprises a vessel 11 having a first end part 17 forming a bottom wall 18, a second end part 19, and a longitudinal inner wall 16 extending between the first and second end parts 17, 19. The second end part 19 may, as disclosed, be provided with a lid 20. In the disclosed embodiment the lid 20 is provided with a top opening 21. The vessel 11 may e.g. be cylindrical.

The vessel 11 may comprise a bottom valve 22 which can be used to drain fluid content of the reactor 200 and also to release solid reaction members.

The vessel 11 houses a transformation device 100 comprising a flow distributor 1 of the same type as previously disclosed.

The flow distributor 1 is arranged to be operated by an electrically, pneumatically, or hydraulically driven motor 2.

The flow distributor 1 is arranged with its longitudinal center axis L1 extending essentially coaxially with the longitudinal center axis L2 of the vessel 11.

The vessel 11 is provided with a plurality of supports 12 arranged adjacent the longitudinal inner wall 16 of the vessel 11. The supports 12 are preferably evenly distributed along the circumference of the longitudinal inner wall 24 of the vessel 11. The supports 12 may be interconnected to form an insert 14 that is removable as one unit from the vessel 11. Alternatively, each support 12 may be provided as one unit. It is to be understood that a single support 12 may be used.

In the disclosed embodiment each support 12 comprises two nozzles 15. The nozzles 15 are arranged as flat nozzles distributed along the longitudinal extension of the support 12. The nozzles 15 are arranged so that two adjacent nozzles 15 are arranged to provide a longitudinally and continuously uniform spray pattern 16 directed towards the peripheral wall 6 of the flow distributor 1. By longitudinally and continuously uniform is meant a spray pattern with an essentially uniform density of droplets as seen across an intended target surface. Thus, the density should be essentially uniform even in any overlapping areas of the spray pattern. The spray pattern provided by the nozzles 15 may differ. In the disclosed embodiment the nozzles 15 are of the flat nozzle type providing a straight stop face against the peripheral wall 6.

The supports 12 may be formed as hollow structures allowing any piping (not shown) required to supply fluid to the nozzles 15. It goes without saying that the pipes may be arranged in a number of ways within the scope of the invention.

The number of nozzles 15 depends on parameters such as the longitudinal height of the peripheral wall 6 of the flow distributer 1, type of flow pattern provided by the nozzles 15, fluid pressure of the cleaning fluid, type of solid reaction members, type of fluid to be supplied to the vessel 11 etc. This applies both to the number of nozzles 15 as seen in the longitudinal direction of the vessel 11 and to the number of nozzles 15 as seen in the circumferential direction. In its most simple form one nozzle would be sufficient since the cleaning fluid is intended to be supplied while rotating the flow distributor 1.

The fluid pressure of the nozzles 15 should preferably be dimensioned so that the impact force is high enough to flush the complete radial cross section of the flow distributor 1 and hence the complete radial cross section of the confinement 7, to remove the solid reaction members (not shown) entrapped therein. Still, the impact force should preferably not be so high that the solid reaction members are damaged.

During normal operation of the flow distributor 1, the supports 12 contribute to enhancement of fluidic shear stress in any of the two rotary directions along the inner wall 16 of the vessel 11. Hence, the supports 12 may act as baffles. To further enhance fluidic shear stress, the longitudinal inner wall 24 of the vessel 11 may comprise a pattern such as longitudinally extending undulations (not shown).

The combination of the vessel 11, the flow distributor 1 and the one or several nozzles 15 with any insert 14 supporting such nozzles may be provided as a kit.

In the following the operation of the reactor will be described based on the highly schematic illustrations given in FIGS. 3a-3f.

Figure 3A:
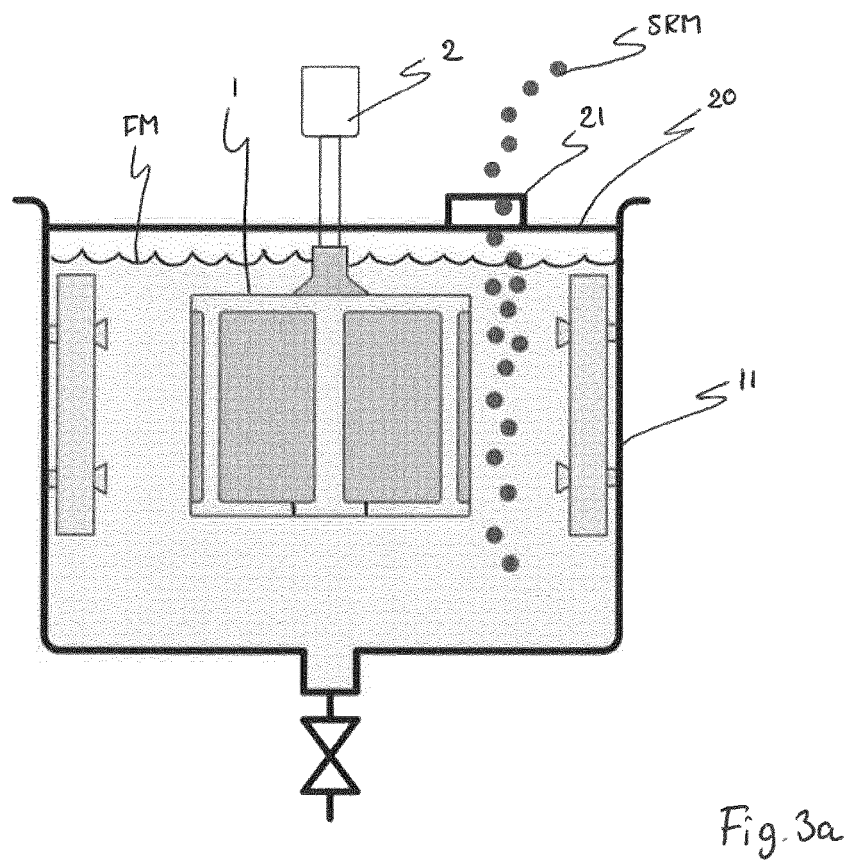
Figure 3B:
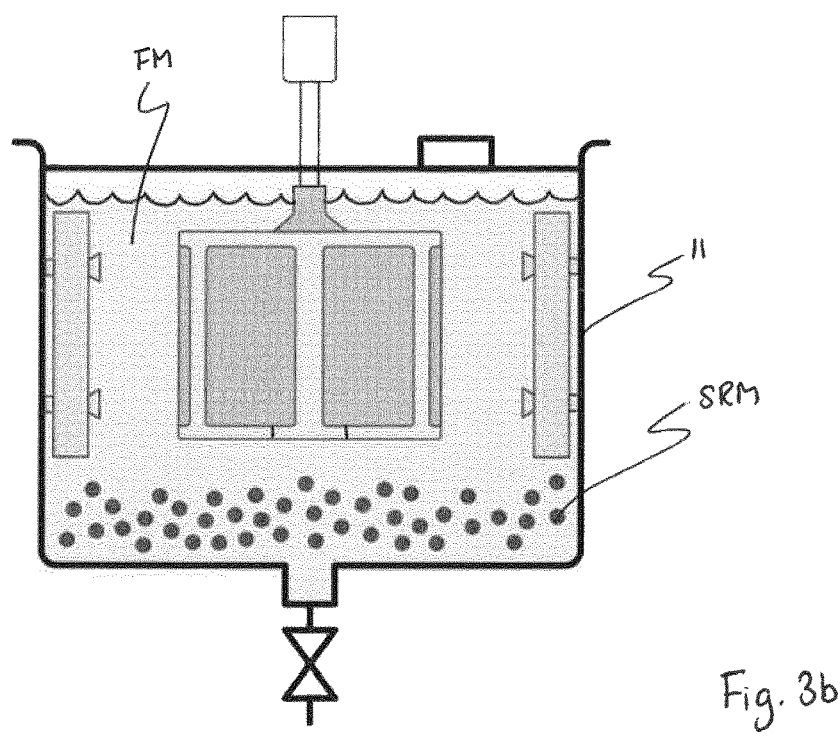

Referring to FIG. 3a, the flow distributor 1 is arranged in the vessel 11 and connected to a motor 2 for allowing rotation of the flow distributor 1.

The vessel 11 is filled with fluidic media FM to a desired level. The vessel 11 is further filled with a desired amount of solid reaction members SRM. The solid reaction members SRM and the fluidic media FM may be supplied via the top opening 21 of the lid 20. It goes without saying that the filling of at least the fluidic media FM may be made via other means such as via a non-disclosed piping. The solid reaction members SRM will due to their inherent density fall to the bottom of the vessel 11, see FIG. 3b. The skilled person will understand that depending on the density, the solid reaction members may also be suspended.

It goes without saying that the fluidic media FM and the solid reaction members SRM may be supplied at the same time, or that the solid reaction members SRM may be supplied before the fluidic media FM.

Figure 3C:
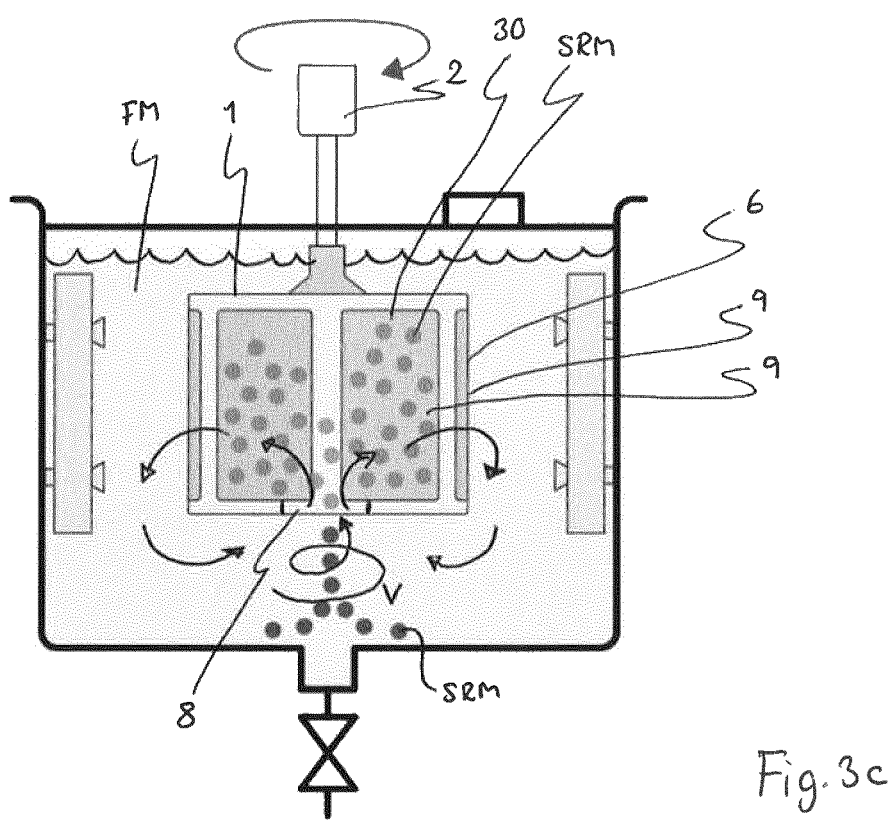

Now referring to FIG. 3c, the motor 2 is started whereby the flow distributor 1 is rotated at a pre-set operation speed. The operation speed should be at such speed that a vortex V is generated causing the solid reaction members SRM to be sucked and forced together with the fluid media FM into the confinement 7 of the flow distributor 1 via its central bottom opening 8. The thus sucked solid reaction members SRM will be trapped against the inner walls of the flow distributor 1 while the fluid medium FM is allowed to transfer in the radial direction out of the flow distributor 1 via the at least one fluid medium outlets 9 located in the peripheral wall 6 of the flow distributor. The solid reaction members SRM are prevented from leaving the flow distributor 1 via the fluid medium outlets 9 by the peripheral retaining mesh 30.

Figure 3D:
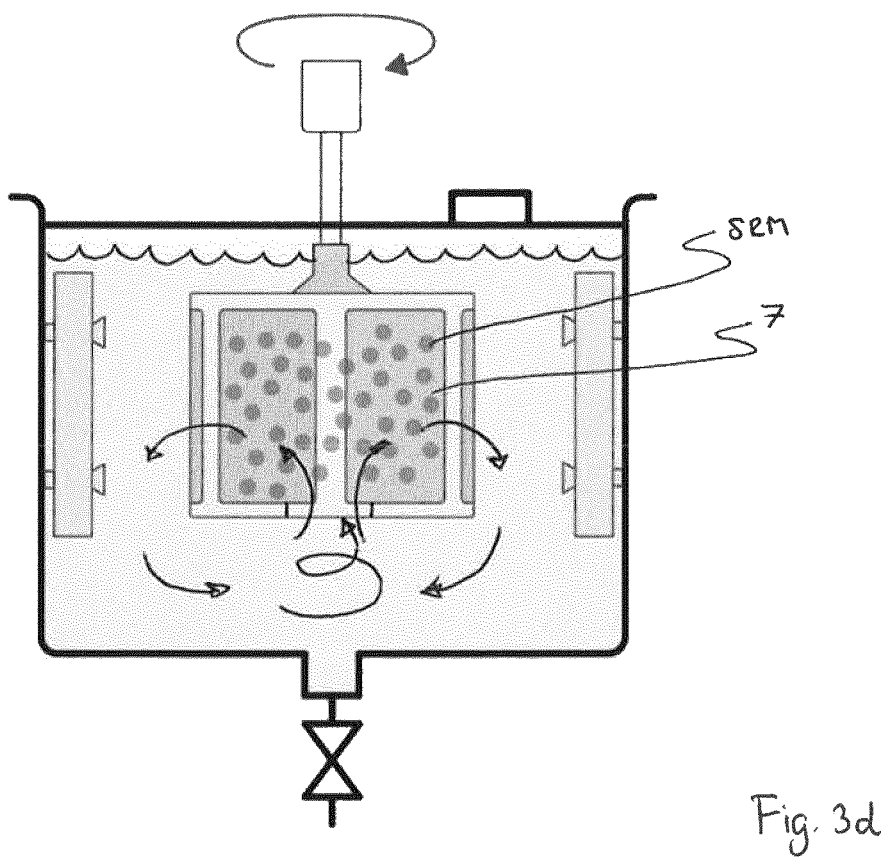

Referring to FIG. 3d, as the operation proceeds, all solid reaction members SRM will be entrapped inside the confinement 7 while the fluid medium FM is circulated through and reacting with the entrapped solid reaction members SRM.

Figure 3E:
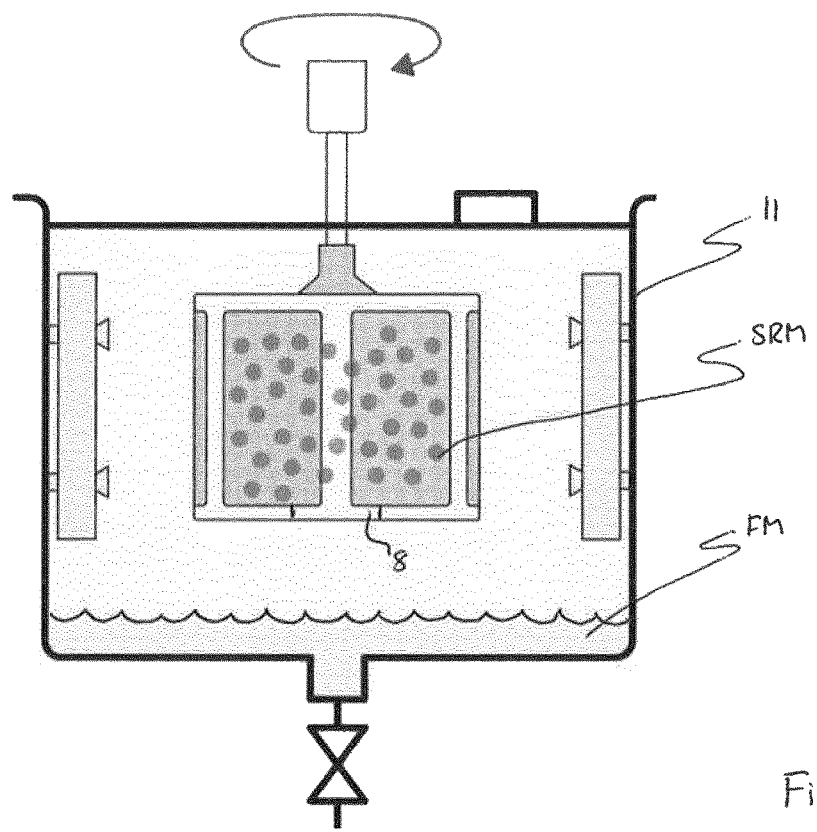

Referring to FIG. 3e, when the reaction is deemed to have reached a target level, the rotation speed of the flow distributor 1 is reduced and set to a liquid draining speed. While rotating the flow distributor at the liquid draining speed, the bottom valve 22 is opened and the processed fluidic media FM is drained from the vessel 11 while maintaining the solid reaction members entrapped in the flow distributor 1. The drained processed fluidic media FM may be fed to and collected into a dedicated collecting vessel (not shown). It goes without saying that some solid reaction members SRM will inevitable be let out together with the drained fluidic media. Such solid reaction members may be collected by a filter (not shown) which is arranged in a position between the bottom valve 22 and the collecting vessel.

Depending on the desired total volume of fluid medium FM to be treated, the process given above may be repeated by simply filling the emptied vessel 11 anew with fluid medium. The process may be repeated either until the desired total volume of fluid medium FM has been treated or until the solid reaction members have been consumed and must be replaced and hence unloaded. It goes without saying that the bottom valve 22 must be closed before initiating a new process.

Figure 3F:
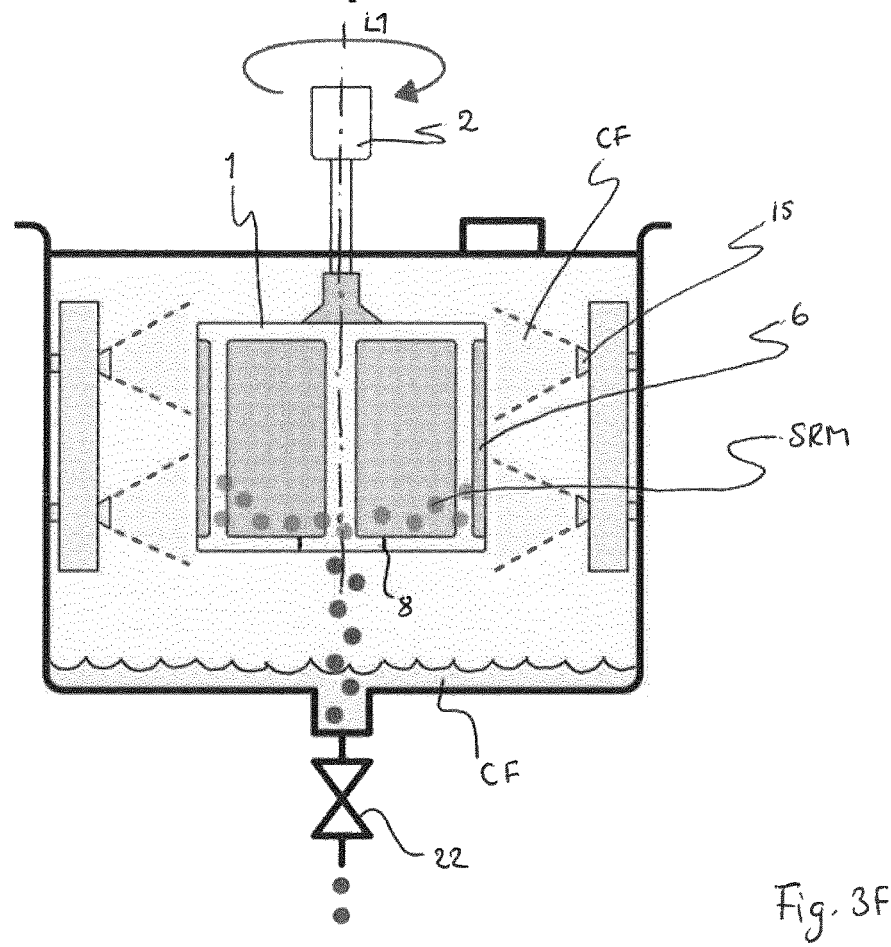

In order to clean the vessel 11 and the flow distributor 1 a cleaning process is performed. Reference is made to FIG. 3f.

The flow distributor 1 is set to operate at a solid member releasing speed. The solid member releasing speed should be low enough for any vortex effect sucking and forcing fluid into the flow distributor via its opening in the bottom wall and further in a radial direction towards, and out via the peripheral wall, to be overruled. Accordingly the solid member releasing speed is substantially lower than the operational speed.

While running the flow distributor 1 at the solid member releasing speed, a supply of cleaning fluid CF is directed, via the at least one nozzle 15, towards the peripheral wall 6 of the flow distributor 1. The pressure of the supplied cleaning fluid CF should be strong enough to force the solid reaction members SRM in the radial direction of the flow distributor 1 towards its longitudinal center line L1. The solid reaction members SRM will leave the flow distributor 1 together with the cleaning fluid CF via the outlet 8 thereof. The used cleaning fluid CF and the solid reaction members SRM are released from the vessel 11 via the bottom valve 22.

The cleaning fluid CF may be any suitable liquid fluid and may be the same as the fluid medium FM used during the reaction.

The cleaning fluid CF may be supplied as a continuous or a pulsating flow.

The used cleaning fluid CF may be filtrated and re-circulated back (not disclosed) to the nozzles.

The solid reaction members SRM may be fed to a dedicated collecting vessel (not disclosed).

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the figures, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combinations of these measures cannot be used to advantage.

The invention claimed is:

1. A method for performing, by means of solid reaction members, a biological or chemical transformation, or physical or chemical trapping from, or release of agents to, a fluidic media, and a subsequent cleaning of a reactor, said reactor comprising:

a vessel in which a transformation device has been mounted, said transformation device comprising:

a cylindrical flow distributor comprising a top wall, a bottom wall and a peripheral wall extending between the top and bottom walls, whereby said walls define at least one confinement in which said solid reaction members can be trapped and in which said transformation is performed, the flow distributor further comprising:

at least one bottom opening located in the vicinity of the center of the bottom wall, said opening being adapted for receiving fluid medium and initially suspended solid reaction members and releasing fluid medium and used solid reaction members which have been entrapped in said confinement, at least one fluid medium outlet permeable for said fluid medium but impermeable for solid reaction members, said at least one fluid medium outlet being located on said peripheral wall, and a means for rotating the transformation device, wherein the reactor further comprises at least one nozzle arranged on a longitudinal inner wall of the vessel, and wherein the at least one nozzle is arranged to direct a flow of a cleaning fluid in a direction towards a longitudinal center axis of the flow distributor:

the method comprising:

a) supplying to the vessel a desired amount of solid reaction members;

b) filling the vessel with fluidic media to a desired level;

c) performing a chemical reaction by rotating the flow distributor at an operation speed until the chemical reaction between the solid reaction members and the fluidic media is deemed to have reached a target level, during which a rotation vortex is generated causing the solid reaction members to be sucked and forced together with the fluid media into the confinement of the flow distributor via the at least one bottom opening, whereby the solid reaction members will be trapped against the inner walls of the flow distributor while the fluid medium is allowed to transfer in the radial direction out of the flow distributor via the at least one fluid medium outlets located in the peripheral wall of the flow distributor;

d) setting the rotation speed of the flow distributor to a liquid draining speed;

e) draining the fluidic media from the vessel via a bottom valve while maintaining the solid reaction members in the flow distributor;

f) repeating steps b)-e) until the solid reaction members have been consumed or until a desired total volume of fluidic media has been processed;

g) reducing the rotation speed of the flow distributor low enough to enable the solid reaction members which have been trapped in the flow distributor to leave the flow distributor via the at least one bottom opening when contacted by a cleaning fluid, while maintaining the rotation of the flow distributor; and h) directing, by means of the at least one nozzle, a supply of cleaning fluid towards and through the peripheral wall of the flow distributor, thereby forcing the solid reaction members which have been trapped in the flow distributor in the radial direction towards the longitudinal center of the flow distributor and further out of the flow distributor via the at least one bottom opening and further out of the vessel via the bottom valve.

2. The method of claim 1, wherein the cleaning fluid and the treated fluidic media when released from the vessel via the bottom valve are fed to different dedicated collecting vessels.

3. The method according to claim 1, wherein the cleaning fluid and treated fluidic media are filtered before being fed to the respective dedicated collecting vessels.

4. The method according to claim 1, wherein the cleaning fluid is recirculated.

5. The method according to claim 1, in which the cleaning fluid is the same fluid as the fluidic media.

6. The method according to claim 1, in which the cleaning fluid is supplied as a continuous or a pulsating flow.

7. A method in a reactor for performing, by means of solid reaction members, a biological or chemical transformation, or physical or chemical trapping from, or release of agents to, a fluidic media, and a subsequent cleaning of the reactor, wherein the reactor includes a vessel having mounted therein a transformation device including at least a cylindrical flow distributor comprising a top wall, a bottom wall and a peripheral wall extending between the top and bottom walls, at least one bottom opening located near a center of the bottom wall, and at least one fluid medium outlet located on the peripheral wall, the fluid medium outlet being permeable for fluid medium but impermeable for solid reaction members, a means for rotating the transformation device, and at least one nozzle arranged on a longitudinal inner wall of the reactor, wherein the at least one nozzle is arranged to direct a flow of a cleaning fluid in a direction towards a longitudinal center axis of the flow distributor, the method comprising: a) supplying to the vessel a desired amount of solid reaction members; b) filling the vessel with fluid media to a desired level; c) rotating the flow distributor at an operation speed to enable a chemical reaction between the solid reaction members and the fluid media to reach a target level, the operation speed causing the solid reaction members to be forced together with the fluid media into the flow distributor via the at least one bottom opening, whereby the solid reaction members will be trapped against the inner walls of the flow distributor while the fluid medium is enabled to exit the flow distributor via the at least one fluid medium outlet located in the peripheral wall of the flow distributor; d) reducing the operation rotation speed of the flow distributor to a liquid draining speed, the liquid draining speed enabling the fluid media to drain from the vessel via a bottom valve while maintaining the solid reaction members in the flow distributor; e) repeating steps b)-d) until the solid reaction members have been consumed or until a desired total volume of fluid media has been processed; f) reducing the liquid draining rotation speed of the flow distributor to enable solid reaction members which have been trapped in the flow distributor to leave the flow distributor via the at least one bottom wall opening when contacted by a cleaning fluid, while maintaining the rotation of the flow distributor; and g) directing, by means of the at least one nozzle, a cleaning fluid towards and through the peripheral wall of the flow distributor, the cleaning fluid, when contacting the solid reaction members, forcing the solid reaction members which have been trapped in the flow distributor in a radial direction towards a longitudinal center of the flow distributor and further out of the flow distributor via the at least one bottom opening and further out of the vessel via the bottom valve.

* * * * *